United States Patent Office 3,280,240
Patented Oct. 18, 1966

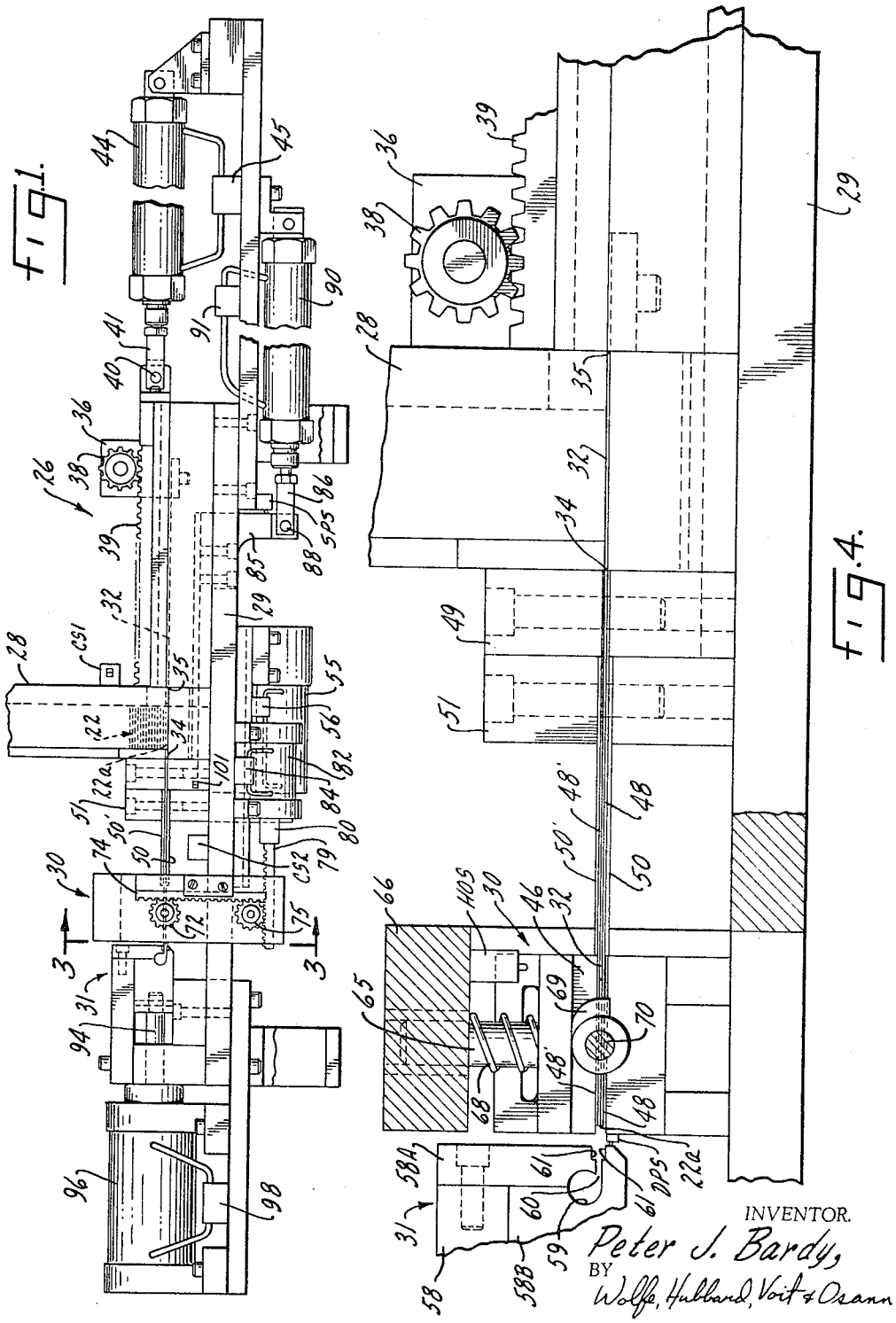

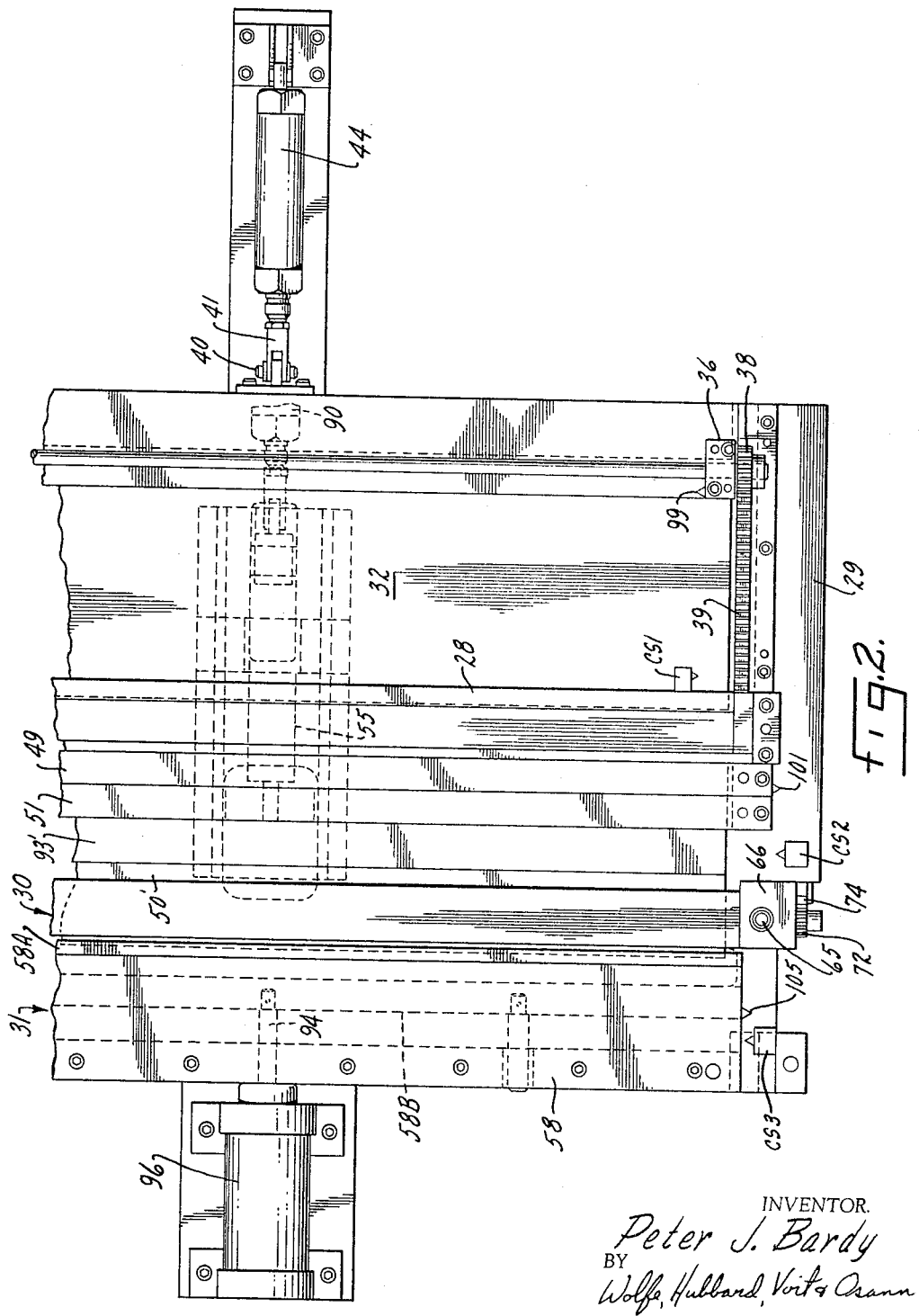

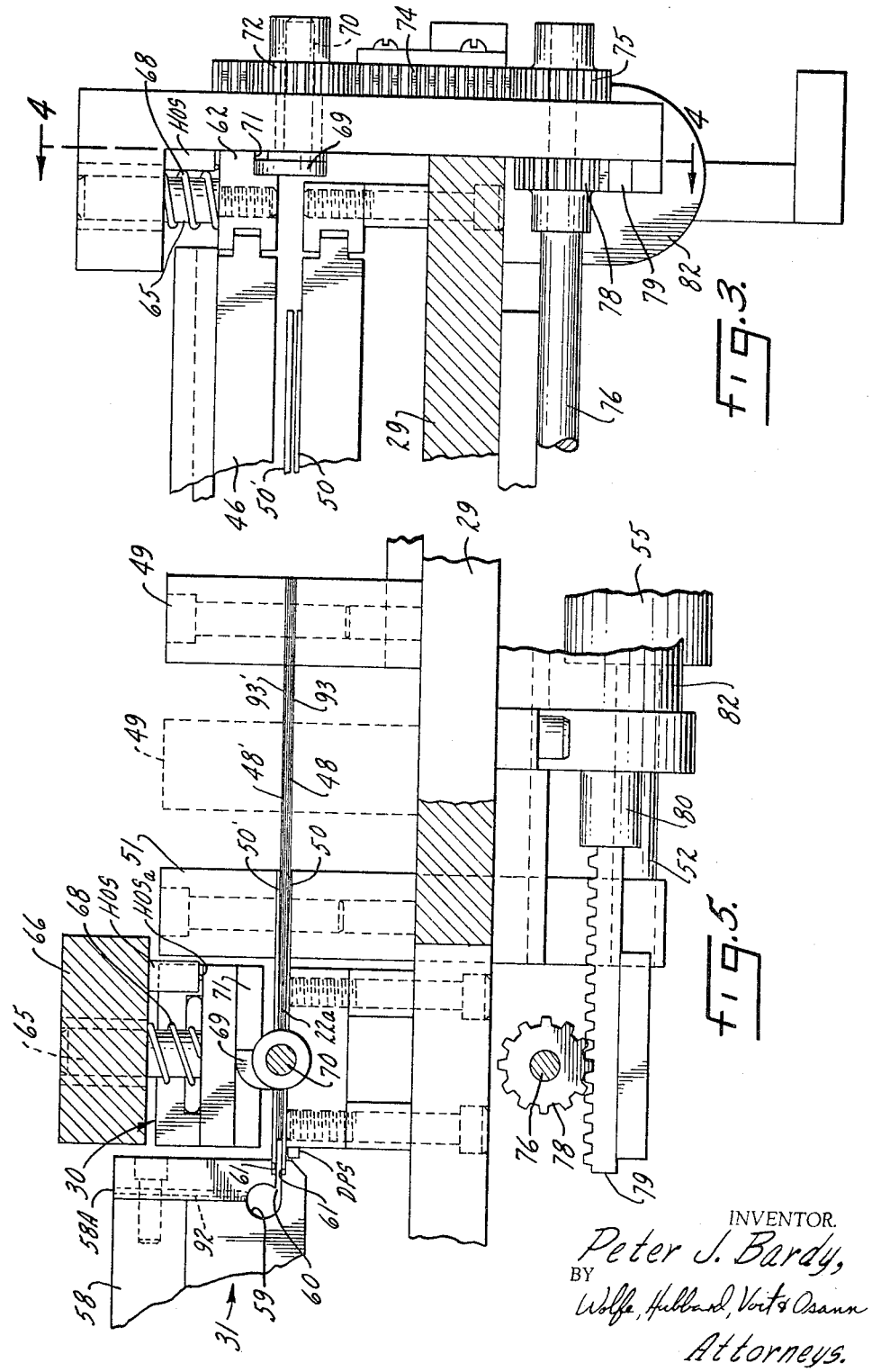

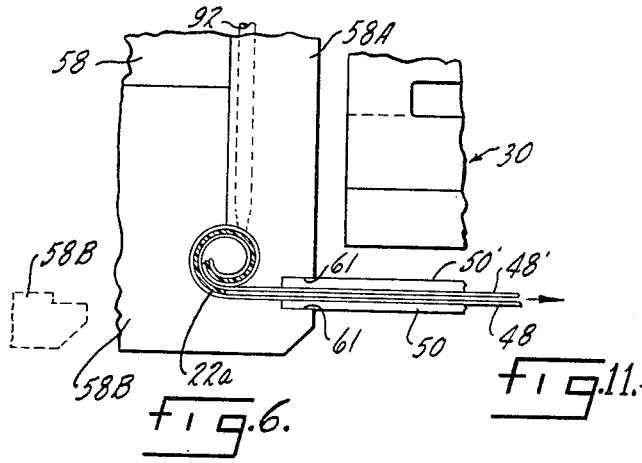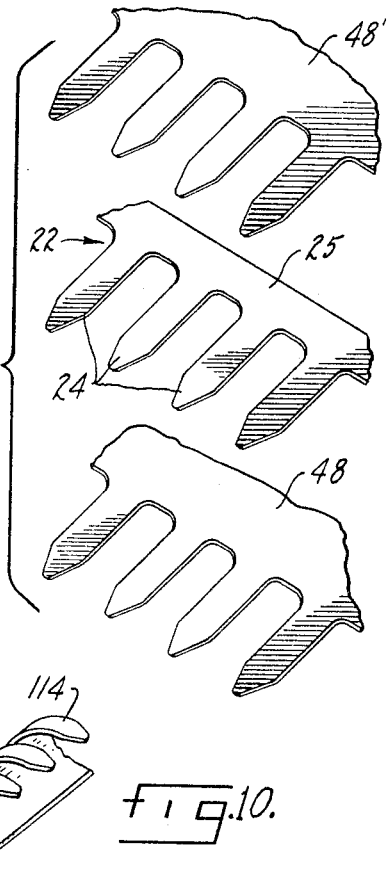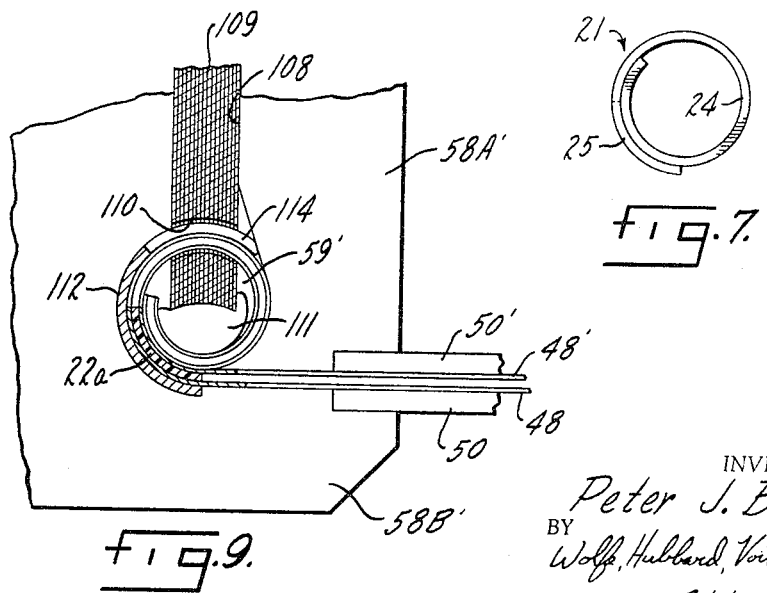

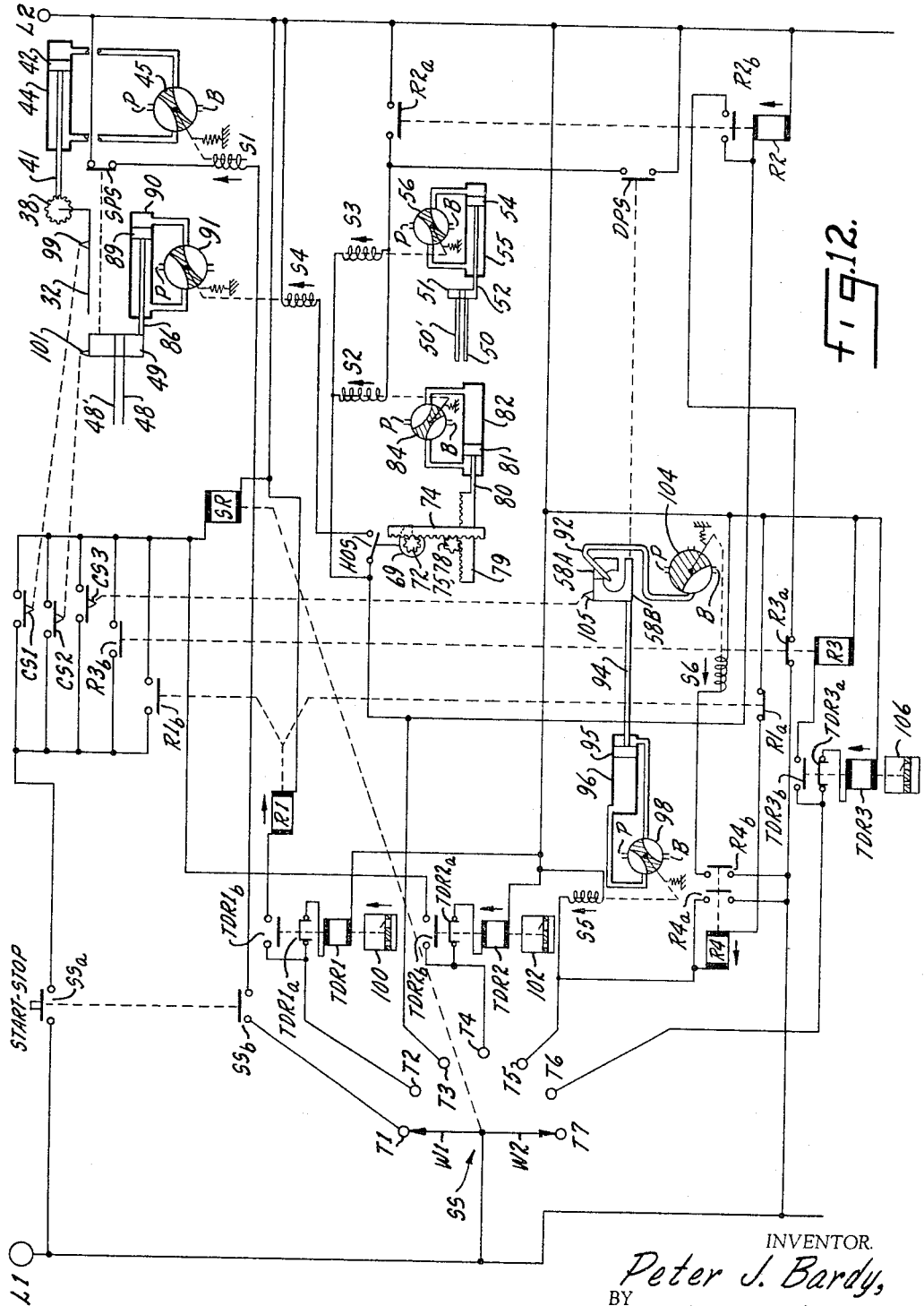

3,280,240
BINDING METHODS AND APPARATUS
Peter J. Bardy, Park Ridge, Ill., assignor, by direct and mesne assignments, to Spiral Binding Co., Inc., a corporation of New York
Filed Feb. 11, 1963, Ser. No. 257,695
26 Claims. (Cl. 264—242)

The present invention relates in general to the binding of stacks of sheets and, more particularly, to improved methods and apparatus suitable for use in the formation of plastic binders used in binding such sheets into tablets, books, or the like. In its principal aspects, the invention is concerned with the formation of improved binders made, for example, of thermoplastic material, yet wherein such binders can be formed on a mass production basis without being subjected to defects resulting from operations performed on such material when in the softened state.

For a number of years there has been an increasing demand, both by businesses and the general public, for loosely bound articles (e.g., tablets, notebooks, account books, or the like) which are economical, compact, light in weight, and attractive in appearance, yet which are sturdy and which will securely hold stacks of sheets. While metallic loose-leaf ring binders have been in widespread use, they do not meet many of the foregoing requisite conditions. Moreover, they require specialized manufacturing and assembly procedures. Consequently, in an effort to meet the demand, while at the same time attempting to overcome the disadvantages inherent with metallic ring binders, manufacturers turned to binders which are made of thermoplastic materials.

While plastic binders satisfy the above requisite conditions, they have presented many manufacturing problems which have heretofore remained unsolved. Typical of the equipment commonly employed in forming such binders have been machines having a continuous cloth belt which is trained about rollers and a forming mandrel. The precut binder blank is carried by the belt past a heater where the blank is softened. The softened blank is then carried by the belt about the forming mandrel where it is curled into a convolute form. The mandrel and the binder are then shifted laterally so as to permit removal of the binder from the mandrel. Such complex motions require either skilled personnel or bulky and expensive equipment. In either case the operation is time consuming and unsatisfactory. Another disadvantage of such machines is that they are not suitable for use in simultaneously forming binders and binding stacked sheets. Consequently, such machines simply do not meet the stringent requirements of present day automated manufacturing procedures. Moreover, the resultant binder elements are weakened and made less attractive due to the fact that the material of the cloth belt bites into the softened blank during the forming operation, thus leaving impressions in the outer face of the binder.

Because of the foregoing problems, attempts have been made to develop equipment wherein the plastic blanks are heated one at a time, and then pushed edgewise while in a softened state into a curling die. Such edgewise shifting of a softened blank has not proved successful, or even practical. Even when the blank is confined between continuous rigid guide surfaces, it tends to become distorted, thus damaging the blank and oft times fouling or jamming the feed passage. Moreover, edgewise shifting of the softened blank creates internal stresses which cause defects in, and resultant weakening of the binder element. Such defects are primarily located in the vicinity of the base of the teeth of the comb-like binder.

Because of the problems attendant edgewise shifting of softened plastic blanks, the binder manufacturers have had to resort to the use of other types of forming equipment, generally the cloth belt and mandrel type of machine described above.

It is a general aim of the present invention to provide improved binder forming methods and apparatus which overcome all of the foregoing disadvantages and which are characterized by the ability to produce plastic binder elements which are of high uniform quality and void of defects or blemishes that impair both the usefulness and appearance of such elements. While the present invention will find especially advantageous use in the formation of plastic binder for stacks of sheet material, or in the simultaneous formation of such binders and application thereof to a stack of sheets, it is not so limited in its scope. Thus, the invention will also find use in the shaping and forming of a wide range of plastic articles wherein a softened thermoplastic blank must be shifted, for example, to a forming station.

Another object of the invention is to provide novel apparatus for forming elements made of thermoplastic material which is completely automatic in operation and characterized by its ability to form, on a repetitive basis, a plurality of such elements, yet wherein the danger of softened plastic blanks fouling or otherwise jamming the apparatus is substantially eliminated. In this connection, it is an object of the invention to provide an improved automatic apparatus for forming plastic binders or like elements characterized by its rapidity of operation and its reliability in use, even when operated by untrained personnel, thus making practical the mass production of such elements.

An ancillary object of the present invention is the provision of improved binder forming methods and apparatus which are substantially more economical than conventional methods and apparatus since fewer blanks are damaged during the feeding operation and, less maintenance time is required as a result of the elimination of a primary source of fouled equipment (thus reducing the cycling time of the equipment), yet where the resultant products produced are of more uniform and better quality than heretofore obtained.

It is an important and more specific object of the invention to provide novel feeding methods and apparatus for positively feeding softened thermoplastic blanks from a heating to a forming station without risk of damaging the softened blanks as a result of the applied feeding forces.

An allied object of the invention is the provision of improved methods and apparatus for affirmatively feeding softened thermoplastic blanks into a curling die, yet wherein no feeding forces are applied to the edges of the blanks when they are in the softened state.

As a consequence of attaining the foregoing objective, not only are the resultant products substantially free of defects, but moreover, irregularly shaped planar blanks can be affirmatively fed into the die irrespective of which marginal edge of the blank is first presented to the mouth of the die. Thus, in the case of plastic binders, for example, which are generally curled from blanks having a comb-like configuration, if one or more of the blanks are placed in the supply hopper with their teeth projecting away from the mouth of the die (as opposed to the more conventional orientation with teeth projecting towards the die mouth), the softened blank will still be advanced into the die without damaging the teeth.

A further object of the invention is to provide an automatic plastic binder forming apparatus characterized by its compact size, yet which is simple in both construction and operation.

In another of its important aspects, it is an object of the invention to provide novel methods and apparatus for simultaneously forming plastic binders and for applying such binders to a stack of sheets.

Other objects and advantages of the invention will become apparent as the following description proceeds, taken in conjunction with the accompanying drawings, in which:

FIGURE 1 is a fragmentary side elevation of a plastic binder forming apparatus embodying the features of the present invention, here depicting the general organization of components of the apparatus prior to insertion of a plastic blank into the heating station;

FIG. 2 is a fragmentary plan view of the apparatus shown in FIG. 1;

FIG. 3 is an enlarged fragmentary sectional view taken substantially along the line 3—3 of FIG. 1 and illustrating particularly the details of the heating platen actuating mechanism;

FIG. 4 is an enlarged fragmentary sectional view taken substantially along the line 4—4 of FIG. 3, here showing the relative positions of the feed and heating components just after insertion of a plastic blank into the heating station;

FIG. 5 is a fragmentary sectional view similar to FIG. 4, here illustrating in solid lines the relative positions of the feed and heating components just prior to insertion of the softened blank into the curling die and, in broken lines, just after insertion of the softened blank into the curling die;

FIG. 6 is an enlarged fragmentary sectional view illustrating the blank after insertion into the curling die and, in broken lines, the position of the movable die member when the formed binder element is ready for ejection from the forming station;

FIG. 7 is an end view of a formed binder element;

FIG. 8 is a perspective view of a stack of sheets here bound into book form by means of a plastic binder element made in accordance with the present invention;

FIG. 9 is an enlarged sectional view similar to FIG. 6 of a modified die construction, here illustrating portions of the apparatus during the simultaneous formation of a binder element and application thereof to a stack of sheets to form the bound book shown in FIG. 8;

FIG. 10 is a fragmentary perspective view of the die insert used in the apparatus shown in FIG. 9;

FIG. 11 is an exploded perspective view of portions of a comb-like plastic blank and the complementary shaped, flexible, metallic feed shims used when simultaneously forming binder elements and applying such elements to a stack of sheets; and, FIG. 12 is a schematic wiring diagram illustrating the electrical components used in an exemplary control circuit for the binder forming apparatus shown in FIG. 1.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

Referring now to the drawings, there is illustrated in FIG. 8 a stack of sheets bound into the form of a tablet or book 20 by means of a plastic binder element 21 which is here made by methods and apparatus embodying the features of the present invention. In accordance with conventional practice, the illustrative binder element 21 is formed from a comb-like thermoplastic blank, generally indicated at 22 in FIG. 11, having a plurality of parallel teeth 24 projecting from an elongate back portion 25. The particular material from which the exemplary blank 22 is stamped, or otherwise preformed, is not critical to the present invention, since plastic binder elements can be made in accordance with the present invention from a wide range of thermoplastic materials. Typical of such materials are vinyl acetate, vinyl chloride, cellulose acetate or any of numerous other thermoplastic materials. In the manufacture of the finished binder element 21, the thermoplastic blank 22 is softened (for example, by subjecting it to heat) and then formed into a convolute shape as best illustrated in FIGS. 7 and 8 by curling teeth 24 inwardly upon the back portion 25 and upon themselves. The curled blank is then allowed to cool or set, thus providing the finished binder element 21 shown in FIG. 8.

Turning to FIG. 1, there is illustrated an exemplary forming apparatus, generally indicated at 26, suitable for manufacturing binder elements 21 in accordance with the features of the present invention. As the description proceeds, it will become apparent that the present invention will find use in a wide variety of environments where it is desired to form blanks of thermoplastic material into finished or partially finished products having any desired shape, particularly when it is required that such products be manufactured on a repetitive or mass production basis. However, in order to facilitate the ensuing discussion, the invention will here be described in conjunction with apparatus and methods for manufacturing plastic binder elements 21 of the type shown in FIG. 8.

In the illustrative form of the invention, the forming apparatus 26 includes a supply station or hopper 28 mounted on the frame 29 of the apparatus for maintaining a supply of thermoplastic blanks 22. The blanks 22 are fed seriatim from the supply hopper 28 to a heating station, generally indicated at 30, where they are softened, thus making the blank readily moldable. While still in the softened state, the blanks are advanced from the heating station 30 to a forming station, generally indicated at 31, where they are shaped and allowed to cool and set.

In order to feed blanks 22 seriatim from the supply hopper 28, the apparatus 26 is provided with a reciprocable feed blade 32 which is alined with the rearmost edge of the lowermost blank 22a in the hopper, the latter having transverse slits 34, 35 disposed at its lower front and rear edges to permit passage of the blade 32 therethrough and hence stripping of the lowermost blank from the stack. To permit reciprocable motion of the feed blade 32, it is rigidly secured to a carriage 36 having a pair of oppositely disposed pinion gears journalled thereon (one of which is shown at 38 in FIG. 1, it being understood that the opposite side of the machine is substantially identical). The pinions are meshed with respective ones of a pair of stationary racks, one of which is shown at 39 in FIG. 1. The carriage 36 is rigidly coupled by a pin 40 to a force transmitting link 41, the latter being affixed to a piston 42 (FIG. 12) disposed within a fluid actuated cylinder 44 having a control valve 45 associated therewith. The arrangement is such that actuation of the control valve will serve to selectively advance the piston 42 and link 41 hence advancing the blade 32 and feeding the lowermost blank 22a, or retract the piston 42 and link 41 in preparation for the next feed cycle. As best illustrated in FIG. 4, it will be observed that during a feed cycle the leading edge of the feed blade 32 engages the rear edge of the lowermost blank 22a and advances it, by forces applied edgewise thereto, along a common plane into the heating station 30 where the blank is disposed for a predetermined period of time in close poximity to a heating element, for example, a suitable electric heating platen 46.

In accordance with one of the important aspects of the present invention, there is provided a novel feed mechanism for affirmatively advancing the softened blank from the heating station 30 into the forming station 31, yet wherein substantially no feed forces are applied to the edge of the softened blank which would tend to damage the blank. In the exemplary form of the invention, this is accomplished by providing a flexible feed element which serves to support the softened blank in face-to-face relation and to carry the blank directly into the forming station. While the flexible feed element may simply take the form of a single thin sheet 48 of flexible metallic shim stock, it preferably includes two such sheets 48, 48' which are rigidly secured in slightly spaced apart parallel relation to a reciprocable feed bar 49.

It will be observed that the feed bar 49 and flexible shims 48, 48' (when in the retracted position as shown in FIG. 4) define a continuous parallel path registering at its rearmost end with the transverse slit 34 in the front wall of the hopper 28, and terminating at its forward end beneath the heating platen 46. When the feed blade 32 strips the lowermost blank 22a from the stack of blanks in the supply hopper 28, the stripped blank is slidably advanced between the lower and upper shims 48, 48' respectively until its leading edge is generally flush with the leading edges of the shims. The shims serve to sandwich the blank 22a and retain it immediately beneath the heating platen 46, the blank being spaced from the heating platen by the upper shim 48'. During the heating cycle, heat is transmitted from the platen through the relatively thin flexible metallic shim stock to the blank.

For the purpose of slidably supporting the shims 48, 48', the feed mechanism includes spaced parallel lower and upper rigid metallic guides 50, 50' respectively which are secured to a guide drive bar 51, the latter being slidably mounted on the frame 29 of the apparatus intermediate the feed bar 49 and the heating station 30. The guides 50, 50' are dimensioned so as to terminate adjacent the rear edge of the heating platen 46 when the drive bar 51 is retracted (as shown in FIG. 4). In order to advance the guides prior to insertion of the softened blank 22a into the forming station 31 so as to provide a continuous restricted path extending from the heating station 30 to the forming station 31, the guide drive bar 51 is coupled to the forward end of a force transmitting link 52 (best illustrated in FIGS. 5 and 12). The rear end of the link 52 is affixed to a piston 54 (FIG. 12) disposed within a fluid actuated cylinder 55 having a control valve 56 associated therewith. Thus, by selectively positioning the control valve 56, the piston 54 may be either retracted to position the guide drive bar 51 in its rearmost position (as shown in FIGS. 1 and 4 where the guides 50, 50' support the shims 48, 48' intermediate the supply hopper 28 and heating station 30), or advanced to position the guide drive bar 51 in its forward position (as shown in FIG. 5 where the guides 50, 50' support the shims 48, 48' during their passage from the heating station 30 into the forming station 31).

In the exemplary apparatus, the forming station has been illustrated as a separable curling die 58 having a stationary member 58A and a selectively movable member 58B which have their adjoining faces shaped to define a die cavity 59. The die cavity 59 is provided with a generally tangential opening or mouth 60 which is horizontally disposed and which is alined with the leading edges of the shims 48, 48' and blank 22a. The rearmost edges of the die members 58A, 58B adjacent the mouth opening are relieved as best illustrated in FIGS. 3 and 5 at 61. The arrangement is such that when the guides 50, 50' are advanced in the manner described above, their leading edges are received within the relieved recesses 61 in the members 58B, 58A respectively, thus forming a continuous path from the heating station 30 into the forming station 31.

To permit the guides 50, 50' to advance without engaging the heating platen 46, provision is made for raising the platen slightly, thus not only insuring that it is removed from the path of the guides 50, 50', but moreover spacing the heating element substantially above the blank 22a which has been softened a predetermined amount. In this manner, provision is made for insuring that the blank 22a will not be excessively heated with a consequent excessive softening thereof. To accomplish this, the heating platen 46 is rigidly secured adjacent its opposite ends to a pair of vertically shiftable support elements 62 (one of which is shown in FIGS. 3, 4 and 5). The support elements 62 are each provided with an upwardly extending rod 64 which is slidably disposed within an opening 65 in a bracket 66 integral with the frame 29 of the apparatus. The support element 62 and hence the heating platen 46 are biased to their downward heating position by means of compression springs 68 which are interposed between the brackets 66 and the support elements 62.

In order to raise the heating platen against the downward biasing effect of the springs 68, a cam 69 is secured to the inner end of a stub shaft 70 journalled in the vertical portion of the bracket 66, as best illustrated by reference to FIGS. 3, 4 and 5 conjointly. The cam is adapted to ride in a groove 71 formed in the support element 62. A pinion 72 (FIGS. 1 and 3) is secured to the outer end of the stub shaft 70 and meshed with the teeth of a vertical rack 74. The rack 74 is also meshed with the teeth of a second pinion gear 75 journalled on the outer projecting portion of a shaft 76 projecting through the lower end of the bracket 66 (it being understood that the shaft 76 extends entirely across the apparatus and is associated with a similar rack mechanism on the opposite side of the frame). A third pinion 78 is affixed to the shaft 76 and drivingly coupled to a rack 79. The rack is integral with a force transmitting link 80 projecting from a piston 81 (FIG. 12) disposed within a fluid actuated cylinder 82 having a control valve 84 associated therewith. Thus, when the control valve 84 is actuated to retract the piston 81 (and hence the rack 79) the shaft 76 will be rotated in a counterclockwise direction (as viewed in FIGS. 1 and 5). As the shaft 76 rotates, the rack 74 (FIG. 1) is raised by the meshed pinion gear 75, thereby causing the pinion 72, stub shaft 70 and cam 69 to rotate in a counterclockwise direction and camming the support element 62 and heating platen 46 to their uppermost position—that is, from the position shown in FIG. 4 to the position shown in FIG. 5.

In carrying out the present invention, provision is made for effecting relative movement between the flexible shims 48, 48' and the die 58 so as to affirmatively advance the shims, and the softened plastic blank 22a which is sandwiched therebetween, into the die cavity 59 when the heating platen 46 has been raised to its upper position and when the leading edges of the guides 50, 50' are received within the recesses 61 in the die members 58B, 58A respectively. To this end, in the illustrative apparatus 26 the shim feed bar 49 is rigidly secured to a carriage 85 (FIG. 1) slidably mounted on the frame of the apparatus. To effect lineal movement of the feed bar 49, the carriage 85 is connected to one end of a force transmitting link 86 by means of a pin 88, the opposite end of the link 86 being affixed to a piston 89 (FIG. 12) disposed within a fluid actuated cylinder 90 having a control valve 91 associated therewith. Thus, when the control valve is selectively positioned so as to advance the piston 89 and the force transmitting link 86 (to the left as viewed in FIGS. 1 and 12), the shim feed bar 49 and the shims 48, 48' are shifted towards the mouth 60 of the die cavity 59.

In order to inhibit buckling of the rearmost portions of the shims 48, 48' (i.e., those portions which extend between the shim feed bar 49 and the guide drive bar 51 when the latter is advanced as shown in FIG. 5), the rear portions of the shims are strengthened by rigidly securing thereto reinforcing plates 93, 93' respectively. As the front portions of the shims 48, 48' pass between the guides 50, 50' and enter the die cavity 59, they carry with them the sandwiched thermoplastic blank 22a which is now in the softened state—the rear portions of the shims and the integral reinforcing plates 93, 93' sliding between the guides 50, 50'. Since the shims are not engaged with an edge of the softened blank, but rather are disposed in face-to-face contact therewith, substantially no internal stresses are set up within the blank which tend to distort or otherwise damage the blank, thus substantially eliminating the danger of destroying the blank or fouling the feed mechanism.

Further advance of the shims 48, 48' and the sandwiched blank 22a into the die is accompanied by simultaneous curling of the front portions of both shims and the confined blank, thereby forming a convolute configuration of the shims and sandwiched blank as best illustrated in FIG. 6. Such curling movement of the shims is permitted due to their resilient flexible nature, it being understood that the leading edges of the reinforcing plates 93, 93' terminate rearwardly of the rearmost edges of the blank 22a and hence the rear reinforced portions of the shims are not required to curl. The softened blank 22a is then permitted to set or harden while confined in the convolute configuration. Of course, if desired, any suitable means can be provided for cooling the blank while it is disposed within the die cavity, thus decreasing the time required for the blank to take a permanent set. Merely by way of example, the exemplary apparatus includes nozzle means (diagrammatically shown at 92 in FIG. 12) for directing one or more jets of cooling air onto the shims 48, 48' and the confined blank 22a. However, those skilled in the art will appreciate that a liquid or any other suitable conventional cooling system can be employed.

To facilitate removal or ejection of the finished binder element from the die cavity 59, provision is made for automatically retracting the movable die member 58B. To this end, the die member 58B, which is slidably mounted on the frame of the apparatus 26, is rigidly secured to one end of a force transmitting link 94 (FIG. 1). The opposite end of the link 94 is affixed to a piston 95 (FIG. 12) which is disposed within a fluid actuated cylinder 96 having a control valve 98 associated therewith. Thus, when the control valve 98 is positioned to permit retraction of the piston 95 and link 94, the die member 58B is shifted away from the shims 48, 48' (e.g., to the left as indicated by the broken line position shown in FIG. 6), thereby opening the die cavity. The blank 22a remains in place between the shims 48, 48' until the latter are retracted (to the right as viewed in FIG. 6), at which time the resilient shims are stripped away from the convolute blank which has hardened sufficiently to resist return to a planar state. As soon as the shims 48, 48' are retracted or stripped away from the finished binder element, the latter is free for gravity discharge to a suitable hopper or conveyor (not shown). In those instances where air jets are utilized to assist in cooling the blank 22a (as shown diagrammatically at 92 in FIG. 12), the jets can serve the dual function of assisting in discharging the binder element by blowing the latter out of the die.

Referring now to FIG. 12 the electric circuit components associated with the apparatus shown in FIG. 1 are there shown. To facilitate a complete understanding of the present invention, the operation of exemplary apparatus together with the cycling steps thereof will hereinbelow be described in connection with the illustrative control circuit shown in FIG. 12. Let it be assumed for the purpose of the ensuing discussion, that the feed blade 32, shims 48, 48', and guides 50, 50' are initially retracted (i.e., in the position shown in FIG. 1), the heating platen 46 is initially in its lower heating position (i.e., as shown in FIGS. 1 and 4), and the die 58 is initially open (i.e., with the movable die member 58B retracted as indicated by the broken line position shown in FIG. 6). It will be observed upon inspection of FIG. 12 that the exemplary control circuit includes a stepping relay SR which is coupled to the wipers W1–W2 of a stepping switch SS, the latter having seven (7) terminals T1–T7. Let it also be assumed that the wiper W1 is initially in contact with terminal T1 it being understood that stepping of the wiper W1 from contact T1 through T7 will complete, in seiatim order, different energizing circuits between the voltage supply lines L1 and L2.

When the operator of the apparatus 26 (FIG. 1) is ready to set the equipment into operation, it is merely necessary that he shift a "start-stop" switch having two sets of contacts $SS_a$, $SS_b$ to the start position with both sets of contacts closed. When the start-stop switch is shifted to the start position, the operator will immediately complete an energizing circuit for a solenoid S1 having its armature connected to the movable spring biased plug of the feed blade control valve 45, this energizing circuit being completed through the now closed contacts $SS_b$ of the start-stop switch and the contacts of a shim position switch SPS (FIGS. 1 and 12) which are closed only when the shims are fully retracted. Thus, the shim position switch SPS serves as a safety device to pervent initiation of a new feed cycle until after the previously formed binder element has been ejected from the die cavity and the shims 48, 48' retracted to their rearmost position.

When the solenoid S1 is energized, its armature will effect 90° rotation of the movable plug in the control valve 45, thus coupling the high pressure side (diagrammatically represented by the designation P) of the fluid pressurizing system to the right hand end of cylinder 44, and simultaneously coupling the opposite end of the cylinder to the low pressure or bleed side of the system (diagrammatically represented by the designation B). This causes the piston 42 to shift to the left (as viewed in FIG. 12), thus advancing the feed blade 32, stripping the lowermost blank 22a from the supply hopper 28 and feeding the blank into the heating station 30. As the feed blade 32 approaches the end of its forward stroke, a cam 99 mounted on the carriage 36 (FIGS 2 and 12) momentarily engages and depresses the actuator of a cam switch CS1, thus coupleting an energizing circuit for the stepping relay SR through the closed contacts $SS_a$ of the start-stop switch and the momentarily closed contacts of the cam switch CS1. Momentary energization of the stepping relay SR effects incremental movement of the wiper W1 from the terminal T1 to the terminal T2 of the stepping switch SS thus energizing the solenoid S1, thereby permitting the spring biased plug of the control valve 45 to return to its initial position and retracing the feed blade 32.

As the wiper W1 steps to terminal T2, an energizing circuit is completed for a time delay device, here shown diagrammatically as a time delay relay TDR1 controlling a set of normally closed wiping contacts $TDR1_a$ and a set of normally open contacts $TDR1_b$. As here shown, the normally closed contacts $TDR1_a$ are connected in series with the energizing circuit for the time delay relay TDR1. The time period during which the relay remains energized is determined by a conventional dash pot mechanism 100 which is coupled to the armature of the relay. During this delay period the blank 22a remains in close proximity to the heating platen 46. Thus, the relay TDR1 defines the heating cycle for the apparatus 26. The arrangement is such that when the relay TDR1 is energized, its armature starts to move slowly (upwardly as viewed in FIG. 12) until the normally open contacts $TDR1_b$ close and the normally closed contacts $TDR1_a$ open. Closure of contacts $TDR1_b$ momentarily completes an energizing circuit for a relay R1 which controls normally closed contacts $R1_a$ and normally open contacts R1$_b$, the latter being connected in parallel with the cam switch CS1. As the normally closed contacts R1$_a$ open, a holding circuit for the spring biased control valve 98 associated with the die 58 is deenergized, thus permitting the die member 58B to return to its closed position in a manner to be described in greater detail below. At the same time, the normally open relay contacts R1$_b$ are momentarily closed, thus again energizing the stepping relay SR for a moment and stepping the wiper W1 to terminal T3 of the stepping switch SS.

Those skilled in the art will understand that the exemplary time delay relay and dash pot arrangement is such that simultaneous with the closure of contacts TDR1$_b$, contacts TDR1$_a$ open to energize the relay TDR1. Consequently, the relay armature moves rapidly back to its initial position with contacts TDR1$_a$ closed and contacts TDR1$_b$ open in readiness for the next cycle of operation. In the interval, however, the wiper W1 has stepped to terminal T3 and hence the relay TDR1 will remain deenergized until the next cycle of operation.

When the wiper W2 steps to terminal T3, energizing circuits are completed for solenoids S2 and S3 through the contacts of a die position switch DPS (FIGS. 5, 6 and 12) which are closed only when the die member 58B is fully closed. Energization of the solenoid S2 causes the spring biased plug of the control valve 84 to shift, thus coupling the left side of cylinder 82 (as viewed in FIG. 12) to the high pressure source P and shifting the piston 81, force transmitting link 80 and rack 79 to the left. This serves to move the heating platen 46 to its uppermost position. At the same time, energization of the solenoid S3 causes the spring biased plug of the control valve 56 to shift, thus coupling the right side of cylinder 55 (as viewed in FIG. 12) to the high pressure source P and shifting the piston 54, force transmitting link 52, drive guide bar 51 and guides 50, 50' to the left until the leading edge of the guides are received within the recesses 61 in the die 58.

For the purpose of insuring that the shims 48, 48' and softened plastic blank 22a are affirmatively fed into the die cavity 59 when the heating platen 46 is raised to its uppermost position, a "heater open switch" HOS is mounted on the bracket 66 (FIGS. 3, 5 and 12) and positioned so that its normally open contacts are closed only when the heating platen is completed raised. As the platen 46 moves upwardly, the support element 62 engages the actuator HOS$_a$ of the switch HOS, thus closing the normally open contacts of the switch (FIG. 12) and completing an energizing circuit for a solenoid S4. Energization of the solenoid S4 causes the spring biased plug of the control valve 91 to rotate 90°, thus coupling the right side of cylinder 90 (as viewed in FIG. 12) to the high pressure source P and shifting the piston 89, force transmitting link 86, shim feed bar 49 and shims 48, 48' to the left. In this manner, the shims and confined softened blank 22a are advanced directly into the cooling die. As the shim feed bar 49 approaches the end of its forward stroke, a cam 101 (FIGS. 2 and 12) momentarily depresses a cam switch CS2 which is connected in parallel with cam switch CS1, thus again completing an energizing circuit for the stepping relay SR and stepping the wiper W1 to terminal T4.

To insure that the guides 50, 50' and shims 48, 48' remain in their advanced state and that the heating platen 46 remains fully open, provision is made for completing a holding circuit for solenoids S2, S3 and S4 at the same time that the wiper W1 steps to terminal T3. To accomplish this, a relay R2 which controls normally open contacts R2$_a$ and R2$_b$ is energized when the wiper W1 steps to the terminal T3 (i.e., at the same time that solenoids S2 and S3 are energized). Closure of contacts R2$_a$ insures that the solenoids S2 and S3 will remain energized even when the die member 58B opens, thus opening the contacts of the die position switch DPS. At the same time, the relay R2 is sealed in through its own now closed contacts R2$_b$. It will be observed upon inspection of FIG. 12 that when the wiper W1 steps from terminal T3 to terminal T4 (i.e., when the cam 101 engages cam switch CS2), the solenoids S2, S3 and S4 remain energized since the relay contacts R2$_a$ and R2$_b$ remain closed.

Stepping of the wiper W1 to the terminal T4 completes an energizing circuit for a second time delay relay TDR2 which is substantially identical in construction to the time delay relay TDR1 described above. In this instance, the relay TDR2 permits a time delay period during which the blank 22a is allowed to harden or set while confined in a convolute shape within the die cavity 59. To this end, the relay TDR2 controls normally closed contacts TDR2$_a$ (through which the relay is energized) and normally open contacts TDR2$_b$. The relay armature is affixed to a dash pot mechanism 102 which is designed to permit relatively slow movement of the armature when the relay is energized so that the contacts TDR2$_b$ close after a preselected time interval. However, when the contacts TDR2$_b$ close, the contacts TDR2$_a$ open, thus deenergizing the relay. The dash pot then permits the armature to rapidly return to its initial state with contacts TDR2$_a$ closed and contacts TDR2$_b$ open. At the instant that normally closed contacts TDR2$_a$ open and normally open contacts TDR2$_b$ close, an energizing circuit is momentarily completed for the stepping relay SR, thereby incrementally stepping the wiper W1 to the next terminal T5. Consequently, when the armature returns rapidly to its initial position with contacts TDR2$_a$ closed, the relay TDR2 is not again energized but rather is simply prepared for the next cycle of operation.

In order to retract the movable die member 58B in preparation for ejection of the finished binder element from the die cavity 59, the terminal T5 of the stepping switch SS is electrically connected to one side of a solenoid coil S5, the opposite side of the coil being connected to the line L2. Hence, when the wiper W1 engages terminal T5, the solenoid S5 is energized, thus rotating the spring biased plug of the control valve 98 90° to couple the right hand end of cylinder 96 (as viewed in FIG. 12) to the high pressure source P while simultaneously coupling the opposite end of the cylinder 96 to the low pressure or bleed side of the pressure system. When this occurs, the piston 95, force transmitting link 94 and movable die member 58B are all shifted to the left so as to open the die 58.

Simultaneous with the energization of solenoid S5, an energizing circuit is completed for a relay R4 which controls normally open contacts R4$_a$ and R4$_b$. Closure of the contacts R4$_a$ serves to seal the relay R4 in its energized state while at the same time completing a holding circuit for the solenoid S5, thus insuring that the die 58 remains open. Closure of contacts R4$_b$ completes an energizing circuit for a solenoid S6 which serves to actuate a control valve 104. As illustrated in FIG. 12, this couples the nozzle 92 directly to the high pressure source P so as to project a fluid jet upon the shims 48, 48' and blank 22a, thereby force cooling the latter. It will be noted that the energizing circuit for the relay R4 includes normally closed contacts R1$_a$. Consequently, when the contacts open (i.e., when the wiper W1 steps to terminal T2 and the contacts TDR1$_b$ of the time delay relay TDR1 close), the relay R4 is deenergized. This opens the holding circuits for solenoids S5 and S6 and allows the die member 58B to return to the die closed position while at the same time stopping the fluid jet emanating from nozzle 92.

Referring to FIGS. 2 and 12 conjointly, it will be observed that as the piston 95 approaches the end of its stroke, a cam 105 on the movable die member 58B momentarily engages a cam switch CS3 which is connected in parallel with cam switches CS1 and CS2, thus momentarily completing an energizing circuit for the stepping relay SR. When this occurs, the wiper W1 is stepped to terminal T6 of the stepping switch SS and an energizing circuit is completed for a time delay relay TDR3 substantially identical to the time delay relays TDR1 and TDR2 described above. In this instance, the relay controls normally closed wiping contacts TDR3$_a$ and normally open contacts TDR3$_b$, the former being connected in series with the energizing circuit for the relay TDR3. The relay armature is connected to a dash pot mechanism 106 which serves to provide a preselected time delay period during which the blank 22$a$ is subjected to further cooling. When the cooling cycle is completed, the contacts TDR3$_b$ close momentarily so as to complete an energizing circuit for a relay R3 which controls normally closed contacts R3$_a$ and normally open contacts R3$_b$. As the contacts R3$_a$ open, the relay R2 is deenergized, thus opening the holding circuit for solenoids S2, S3 and S4 and permitting the spring biased control valves 84, 56 and 91 to return to their initial positions. As a consequence, the heating platen 46 is lowered into its heating position and the guides 50, 50' and shims 48, 48' are returned to the positions shown in FIG. 4. As the shims are retracted, the finished binding element is ejected from the die cavity 59 in the manner previously described. At the same time, closure of relay contacts R3$_b$ completes an energizing circuit for the stepping relay SR, stepping the wiper W1 to terminal T7 and wiper W2 to terminal T1. The apparatus is now ready for another cycle of operation during which the wiper W2 will be stepped successively through terminals T1–T7.

It will be apparent from the foregoing that there has been provided both a novel apparatus and method for manufacturing plastic binders wherein the binders may be easily produced on the mass production basis. Since the binders are not fed by forces applied edgewise when they are in the softened state, they are of considerably higher quality than those heretofore obtained. Of course, those skilled in the art will appreciate that while it is preferable to utilize two shims 48, 48' which sandwich the blank 22$a$, it would also be possible to utilize only the lower shim 48 and still come within the scope of the present invention.

While the invention as thus far described has been considered in conjunction with the formation of binder elements 21, it will find especially advantageous use in the simultaneous formation of such binders and the application thereof to a stack of sheets to form a book or tablet such, for example, as the book 20 shown in FIG. 8.

In accordance with this important aspect of the present invention, a modified die construction is utilized wherein the stationary die member 58A' and the movable die member 58B' (FIG. 9) define a channel 108 for receiving a stack 109 of sheets which are perforated along their lower edges as indicated at 110. The edges of the sheets which project into the die cavity 59' are abutted against a positioning guide 111 which extends axially through the die cavity. In this form of the invention, the movable die member 58B' includes a rigid metallic die insert 112 (best illustrated in FIG. 10) which is provided with a plurality of teeth 114 corresponding to the teeth 24 of the plastic blank 22$a$. When the die member 58B' is closed upon the stack 109 of sheets, the teeth 114 on the insert project through the sheet perforations 110 so as to form, with the die member 58A, a substantially continuous spiral wall for the die cavity.

It will be appreciated that in this modified form of the invention, the shims 48, 48' must also have toothed configurations which are generally identical to the toothed blanks 22$a$ (as best illustrated in FIG. 11) so as to permit the shims to pass through the perforations 110 in the stack 109 of sheets. Of course, when the present invention is simply being used to form the binder elements 21 without applying the same to a stack of sheets, it is not necessary for the shims to have toothed configurations.

I claim as my invention:

1. Apparatus for forming a blank of thermoplastic material into a shaped article comprising, in combination, a forming station, a heating station spaced from said forming station and including heating means for raising the temperature of the thermoplastic material so as to soften the blank, a thin flexible sheet of metallic shim stock disposed adjacent said heating means for providing face-to-face support for a blank and for maintaining the blank in heat transmissive relation with said heating means, and means for effecting relative movement between said flexible sheet and said forming station for affirmatively feeding said sheet and the softened blank carried thereon into said forming station.

2. Apparatus for forming a blank of thermoplastic material into a shaped article comprising, in combination, a forming station, a heating station spaced from said forming station and including heating means for raising the temperature of the thermoplastic material so as to soften the blank, a pair of closely spaced parallel sheets of thin flexible metallic shim stock disposed adjacent said heating means for providing face-to-face support for a blank inserted therebetween and for maintaining the blank in heat transmissive relation with said heating means, and means for affirmatively feeding said flexible sheets and the softened blank carried therebetween into said forming station.

3. Apparatus for forming a planar blank of thermoplastic material into a curled article having a convolute cross section comprisnig, in combination, a curling die defining a transverse die cavity having a tangential mouth, a heating platen disposed upstream of said mouth for raising the temperature of the thermoplastic material so as to soften the blank, thin flexible metallic shim means disposed adjacent said heating means and alined with said mouth for providing face-to-face support for a blank and for maintaining the blank in heat transmissive relation with said heating means, and means for affirmatively feeding said shim means through said mouth so as to carry the softened blank into said cavity and curling both said shim means and the blank into convolute form.

4. Apparatus for forming a toothed plastic binder element from a comb-like blank of thermoplastic material comprising, in combination, a curling die defining a transverse die cavity having a tangential mouth, a heating platen disposed upstream of said mouth for raising the temperature of the thermoplastic material so as to soften the blank, thin flexible shim means disposed adjacent said heating platen and alined with said mouth for providing face-to-face support for a blank and for maintaining the blank in close proximity to said platen, said shim means being made of heat transmissive material so as to permit softening of the blank, and means effecting relative movement between said flexible shim means and said die for affirmatively feeding said shim means into said cavity so as to carry the softened blank into said cavity and curling both of said shim means and the blank into convolute form.

5. Apparatus as defined in claim 4 further characterized in that the leading edges of said shim means are toothed so as to correspond in shape to the comb-like configuration of the thermoplastic blank.

6. Apparatus as defined in claim 4 further characterized in that means are provided for projecting a fluid jet into said cavity for cooling said blank.

7. Apparatus as defined in claim 4 further characterized in that said curling die is formed of a stationary member and a movable member, means for shifting said movable member so as to open said die, and means for retracting said shim means from said cavity so as to strip the formed plastic binder element therefrom and permitting gravity discharge thereof from said die.

8. Apparatus as defined in claim 7 further characterized in that means are provided for projecting a fluid jet into said cavity for cooling said blank, said jet acting to urge the finished binder element out of said cavity upon retraction of said shim means.

9. Apparatus for simultaneously forming a toothed plastic binder element from a comb-like blank of thermoplastic material and for applying the binder element to a stack of sheets perforated along one edge thereof comprising, in combination, a curling die defining a transverse die cavity having a tangential mouth, means for supporting the stack of sheets with their perforated edges projecting into said cavity, a heating platen disposed upstream of said mouth for raising the temperature of the thermoplastic material so as to soften the blank, thin flexible metallic shim means disposed adjacent said heating means and alined with said mouth for providing face-to-face support for a blank and for maintaining the blank in heating relation with said platen, the leading edges of said shim means being toothed to conform to the comb-like configuration of the blank, and means for affirmatively feeding said shim means into said cavity so as to carry the softened blank into said cavity with the teeth of said shim means and said blank passing through the perforations in the sheets so as to form a convolute binder retaining said sheets in book form.

10. Apparatus as defined in claim 9 further characterized in that said curling die is formed of a stationary member and a movable member, said movable member including curved teeth adapted to project through the perforations in the sheets when said die is closed so as to form a substantially continuous spiral wall for said die cavity.

11. In apparatus for forming shaped articles from planar blanks of thermoplastic material, the combination comprising, a supply hopper, a heating station spaced downstream of said hopper, a forming station spaced downstream of said heating station, flexible shim means defining a continuous planar path extending from said hopper to a point alined with said forming station and in close proximity to said heating station, means for feeding blanks stored in said hopper one at a time along said path to said heating station, said shim means serving to support said blanks in said heating station so as to permit softening thereof, and means for driving said flexible shim means and the softened blank supported thereby into said forming station.

12. Apparatus as defined in claim 11 further characterized in that said shim means comprise a pair of spaced parallel sheets of metallic shim stock.

13. Apparatus for forming binder elements from comb-like blanks of thermoplastic material, the combination comprising, a supply hopper, a heating station spaced downstream of said hopper, a curling die defining a transverse die cavity having a tangential mouth, said curling die spaced downstream of said heating station, flexible shim means defining a continuous planar path extending from said hopper to a point alined with said mouth and in close proximity to said heating station, means for feeding blanks stored in said hopper one at a time along said path to said heating station, said shim means serving to support said blanks in said heating station so as to permit softening thereof, and means effecting relative movement between said flexible shim means and said die for driving said shim means and the softened blank supported thereby through said mouth and into said die cavity.

14. Apparatus as defined in claim 13 further characterized in that said shim means comprise a pair of spaced parallel sheets of metallic shim stock.

15. Apparatus as defined in claim 13 further characterized in that the leading edges of said shim means are toothed to conform to the configuration of comb-like blanks.

16. Apparatus as defined in claim 15 further characterized in that said die is formed of a stationary member and a movable member.

17. Apparatus as defined in claim 16 further characterized in that said members define a channel intersecting said cavity for reception of a stack of sheets having perforated edges projecting into said cavity so that when said shim means are driven into said cavity, the teeth on said shim means and on said softened blank pass through the perforations in the sheets whereby the sheets are bound into book form.

18. Apparatus as defined in claim 13 further including rigid guide means extending between said hopper and said heating station.

19. Apparatus as defined in claim 18 further characterized in that said guide means are slidable, and means for driving said guide means downstream when said blank is softened so as to form a continuous guide extending from said heating station to said die mouth.

20. Apparatus as defined in claim 13 further including reinforcing means integral with the rear portions of said flexible shim means for inhibiting buckling thereof during said relative movement.

21. Apparatus for forming a blank of thermoplastic material into a shaped article comprising, in combination, a forming station, a heating station spaced from said forming station and including heating means for raising the temperature of the thermoplastic material so as to soften the blank, a thin flexible sheet of metallic shim stock disposed adjacent said heating means and projecting rearwardly therefrom for providing face-to-face support for a blank and for maintaining the blank in heat transmissive relation with said heating means, means effecting relative movement between said flexible sheet and said forming station for affirmatively feeding said sheet and the softened blank carried thereon into said forming station, and reinforcing means integral with the rearwardly projecting portion of said sheet for inhibiting buckling of the latter during such relative movement.

22. The method of forming shaped articles from a blank of thermoplastic material comprising the steps of supporting said blank on a sheet of flexible metallic shim stock, applying heat to said blank so as to soften the thermoplastic material, driving said shim stock with the softened blank carried thereon into a forming die, and cooling said blank while said shim stock and said blank are confined within said die.

23. The method of forming plastic binder elements from a comb-like blank of thermoplastic material comprising the steps of driving said blank edgewise between a pair of spaced parallel sheets of flexible metallic shim stock, supporting said blank between said sheets, heating said blank so as to soften the thermoplastic material, and driving said sheets with the confined softened blank into a curling die.

24. The method of forming plastic binder elements from a comb-like blank of thermoplastic material comprising the steps of driving said blank edgewise between a pair of spaced parallel sheets of flexible heat transmissive shim stock, supporting said blank between said sheets, heating said blank so as to soften the thermoplastic material, driving said sheets with the confined softened blank into a curling die, and retracting said sheets from the die after said blank has hardened so as to strip said blank from the sheets.

25. The method of binding a stack of sheets which are perforated along one edge thereof comprising the steps of supporting said stack of sheets with their perforated edges projecting into a cavity in a curling die, supporting a comb-like blank of thermoplastic material on a comb-like sheet of flexible metallic shim stock with the teeth of said blank alined with the teeth of said sheet, applying heat to said blank so as to soften the thermoplastic material, and driving said sheet with the softened blank carried thereon into said die cavity with said alined teeth of said sheet and said blank passing through the perforations in said stack of sheets and curling about into a convolute configuration.

26. The method of binding a stack of sheets which are perforated along one edge thereof comprising the steps of supporting said stack of sheets with their perforated edges projecting into a cavity in a curling die, driving a comb-like blank of thermoplastic material between a pair of parallel comb-like sheets of flexible metallic shim stock with the teeth of said blank alined with the teeth of said sheets, applying heat to said blank so as to soften the thermoplastic material, and driving said sheets with the softened blank carried thereon into said die cavity with said alined teeth of said sheets and said blank passing through the perforations in said stack of sheets and curling about into a convolute configuration.

References Cited by the Examiner
UNITED STATES PATENTS

| | | | |
|---|---|---|---|
| 1,359,919 | 11/1920 | Readon | 264—316 |
| 2,304,629 | 12/1942 | Emmer | 18—19 |
| 2,686,932 | 8/1954 | Zoleski | 18—19 |
| 3,122,791 | 3/1964 | Nodherny | 18—19 |
| 3,159,516 | 12/1964 | Harris | 264—316 X |

References Cited by the Applicant
UNITED STATES PATENTS

| | | |
|---|---|---|
| 2,211,743 | 8/1940 | Nelson et al. |
| 2,273,824 | 2/1942 | Barrett. |
| 2,403,644 | 7/1946 | Emmer. |
| 2,910,729 | 11/1959 | Schaller et al. |

WILLIAM J. STEPHENSON, *Primary Examiner.*